United States Patent
Droessler et al.

[19]

[11] Patent Number: 5,899,070
[45] Date of Patent: May 4, 1999

[54] TURBO COMPOUNDED FUEL SUPPLY SYSTEM FOR A GASEOUS FUEL ENGINE

[75] Inventors: Kim J. Droessler, Rockton, Ill.; Walter E. Earleson, West Lafayette, Ind.; Carol J. Smith, Lexington, Ky.

[73] Assignee: Caterpillar Inc., Peoria, Ill.

[21] Appl. No.: 08/742,423

[22] Filed: Oct. 30, 1996

[51] Int. Cl.⁶ .......................... F02B 37/007; F02B 37/013
[52] U.S. Cl. .............................................................. 60/612
[58] Field of Search .................................... 60/612, 605.1

[56] References Cited

U.S. PATENT DOCUMENTS

| | | |
|---|---|---|
| 2,780,053 | 2/1957 | Cowland . |
| 3,250,068 | 5/1966 | Vulliamy . |
| 3,941,104 | 3/1976 | Egli . |
| 4,228,655 | 10/1980 | Herschmann et al. ............... 60/602 |
| 4,299,090 | 11/1981 | Deutschmann ....................... 60/612 |
| 4,400,945 | 8/1983 | Deutschmann ....................... 60/612 |
| 4,496,291 | 1/1985 | Grimmer ............................ 417/247 |
| 4,638,634 | 1/1987 | McLean .............................. 60/612 |
| 5,109,674 | 5/1992 | Sudmanns ........................... 60/612 |
| 5,142,866 | 9/1992 | Yanagihara et al. ............... 60/605.2 |

FOREIGN PATENT DOCUMENTS

| | | | |
|---|---|---|---|
| 2541722 | 8/1984 | France ................................. 60/612 |
| 2818447 | 11/1979 | Germany ............................. 60/612 |
| 56-18030 | 2/1981 | Japan ................................... 60/612 |
| 59-10769 | 1/1984 | Japan ................................... 60/612 |

Primary Examiner—Michael Koczo
Attorney, Agent, or Firm—Michael McNeil

[57] ABSTRACT

In a turbo compounded air and fuel supply system for a gaseous fuel engine, separate turbochargers are utilized to compress the air and gaseous fuel. A first turbocharger has a first turbine connected to an exhaust line from the engine and a first compressor having an inlet open to a source of air. A compressed air supply line has one end connected to the outlet from the first compressor and its other end connected to an engine air inlet. A gaseous fuel supply line has one end connected to a source of low pressure gaseous fuel. A second turbocharger has a second turbine connected to the exhaust line from the engine and has a second compressor with an inlet connected to the gaseous fuel supply line. A high pressure gaseous fuel supply line has one end connected to the outlet of the second compressor and its other end connected to an engine fuel inlet. A computer controlled wastegate valve in the exhaust line allows a portion of the exhaust to be bypassed around the second turbine. Thus, the present invention utilizes waste energy from the engine to compress both the air and fuel supply to a gaseous fuel engine rather than by some external compressor or a device which draws power directly from the engine.

17 Claims, 5 Drawing Sheets

Fig_2

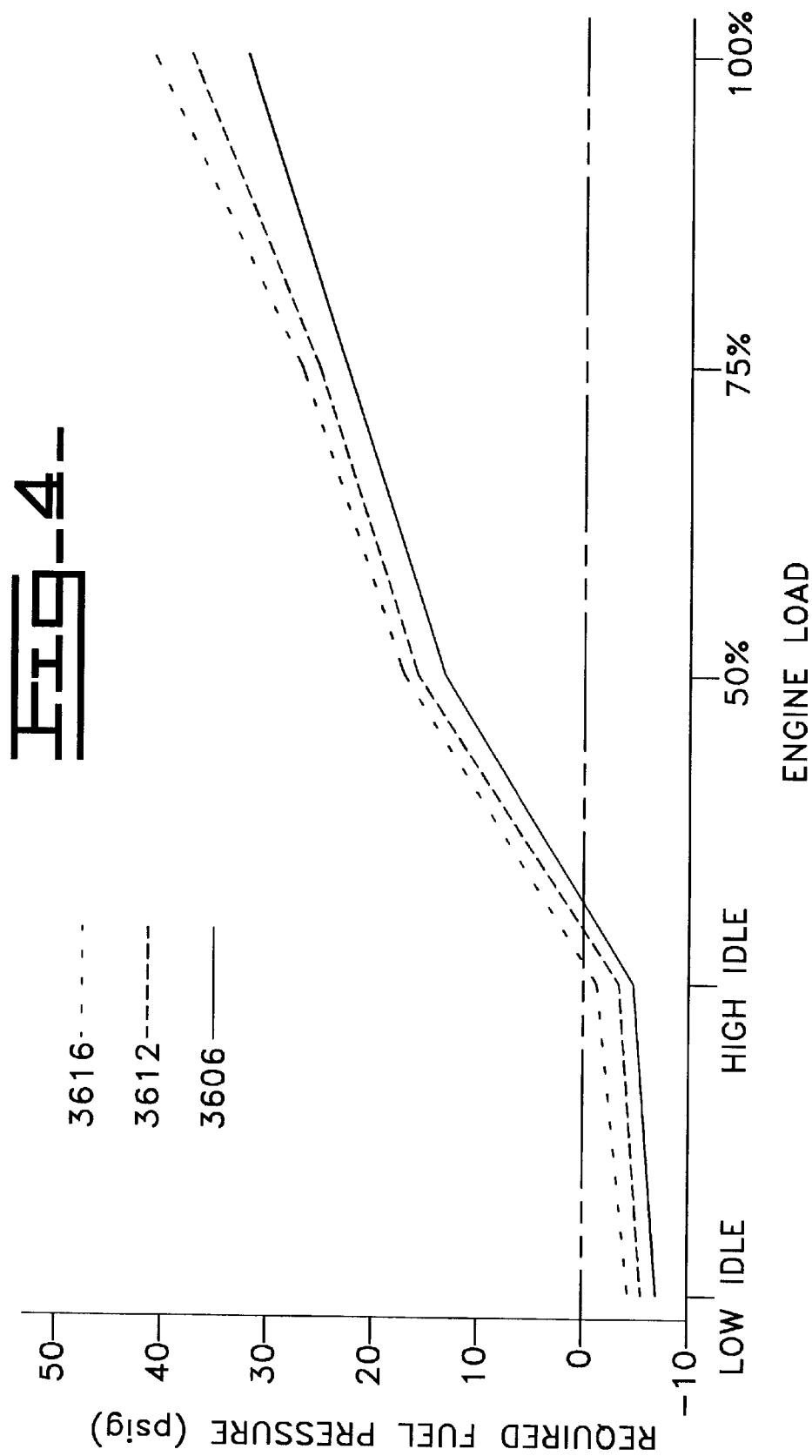

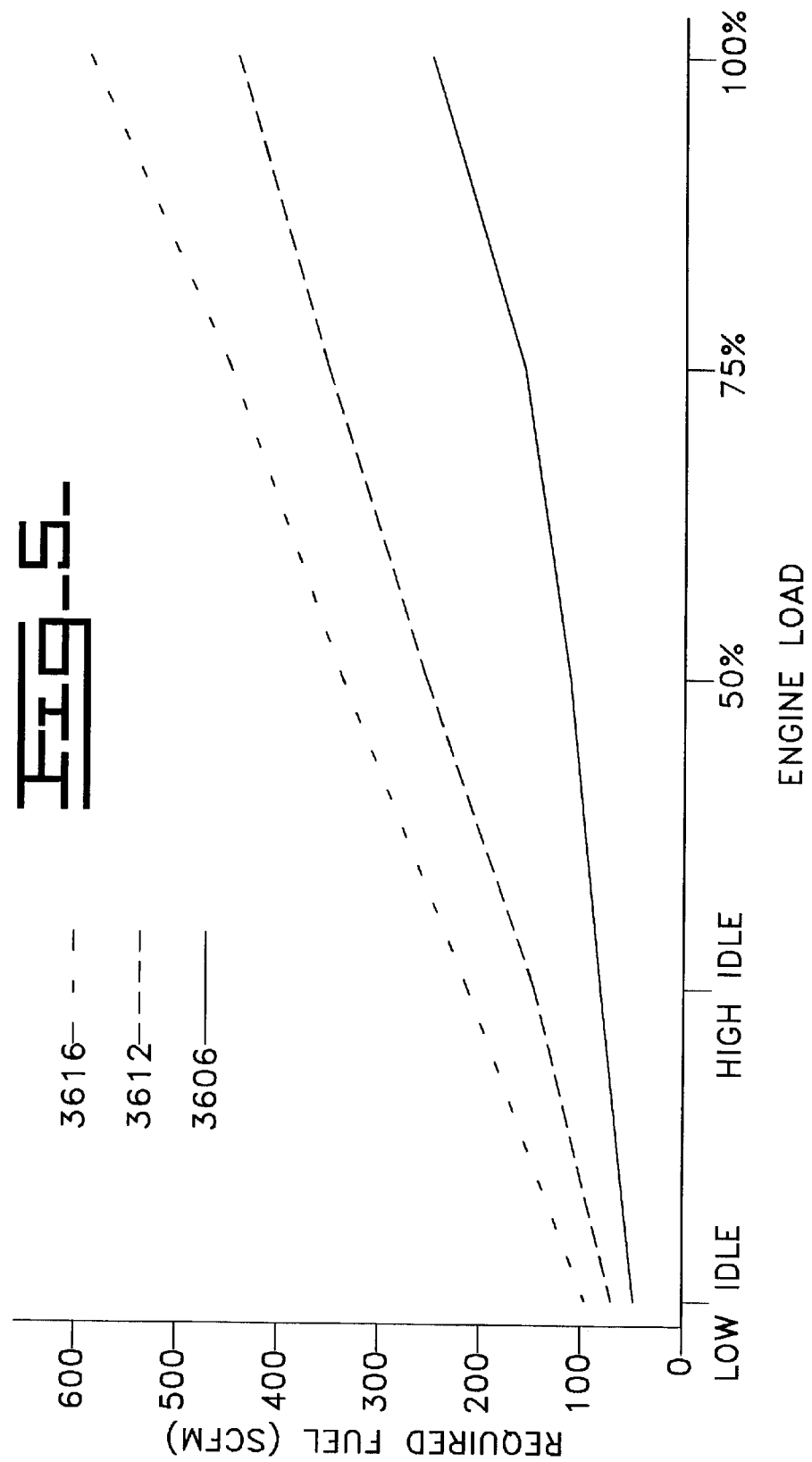
Fig_5

TURBO COMPOUNDED FUEL SUPPLY SYSTEM FOR A GASEOUS FUEL ENGINE

TECHNICAL FIELD

The present invention relates generally to fuel systems for gaseous fuel engines, and more particularly to a turbo compounded fuel supply system for a gaseous fuel engine.

BACKGROUND ART

Gaseous fuel engines are well known in the art. They typically burn readily available natural gas but are capable of burning any suitable gaseous fuel such as butane, propane, methane or even hydrogen. Examples of typical gaseous fuel engines include the series G 3600 gaseous engines manufactured by Caterpillar, Inc. These engines are relatively large and stationary, and are often utilized to power generators and pumps, etc. These Caterpillar gaseous engines are capable of producing power in excess of 1200 horsepower up to about 4700 horsepower provided that the engine is supplied with an adequately pressurized source of gaseous fuel.

In order to put any substantial load on a gaseous engine of the type to which the present invention relates, the gaseous fuel supply pressure must at least be on the order of about 15 psig. Under full load conditions, the engine can require a gaseous fuel supply in excess of about 45 psig. Often because of safety regulations or other limitation factors, the available gaseous fuel supply is often less than about 2 psig. When the gaseous fuel is supplied at such a relatively low pressure, some means must normally be provided to raise pressure sufficiently to operate the gaseous engine with a substantial load. At the present time, those skilled in the art typically employ one of two different methods for raising fuel pressure, both of which suffer from relatively severe drawbacks.

In the first prior art method of raising fuel pressure, air and fuel are mixed at ambient pressure and then compressed as a mixture by a turbocharger attached to the exhaust from the engine. Because the compressed mixture is not only flammable but explosive, extreme precautions must be taken in order to prevent ignition and or leakage of the compressed air/fuel mixture. Because of the potential catastrophic consequences, this method of raising fuel pressure is extremely undesirable. In the more practiced prior art method of raising fuel pressure, a separate compressor unit is employed to generate a reservoir of gaseous fuel that is maintained at about 45 psig. While this method is considerably safer than the other prior art pressure raising method, it is undesirable because of the added expense and complexity in operating a separate compressor unit. In many cases this option is also undesirable because the compressor is either driven mechanically by the engine or by electricity produced by the engine. This undesirable load on the engine lowers the available horsepower to do other work.

The present invention is directed to overcoming these and other problems associated with air and fuel supply systems for gaseous engines.

DISCLOSURE OF THE INVENTION

In responding to the problems and drawbacks associated with the prior art, the present invention contemplates an air and fuel supply system in which the air and fuel are turbo compounded separately. An air and fuel supply system for a gaseous fuel engine according to the present invention comprises a first turbocharger having a first turbine and a second turbocharger having a second turbine; both turbines are connected to an exhaust line from the engine. The first turbocharger includes a first compressor with an inlet open to a source of air. A compressed air supply line has one end connected to the outlet from the first compressor and its other end connected to an engine air inlet. The second turbocharger has a second compressor with an inlet connected to a source of low pressure gaseous fuel. A high pressure gaseous fuel supply line has one end connected to the outlet from the second compressor and its other end connected to an engine fuel inlet. The system also includes means, such as a turbine bypass line, for bypassing an amount of exhaust gas past a second turbine.

One object of the present invention is to provide a safe apparatus for raising air and fuel supply pressures to gaseous fuel engines.

Another object of the present invention is to allow gaseous fuel engines to utilize a relatively low pressure fuel supply without undermining engine performance or available horsepower.

Still another object of the present invention is to provide an improved air and fuel supply system for a gaseous fuel engine.

BRIEF DESCRIPTION OF THE DRAWINGS

FIG. 4 is a graph of required fuel pressure versus engine load for several example gaseous fuel engines.

FIG. 5 is a graph of required fuel volume versus engine load for several example gaseous fuel engines.

DETAILED DESCRIPTION OF THE PREFERRED EMBODIMENT

Figure 1:
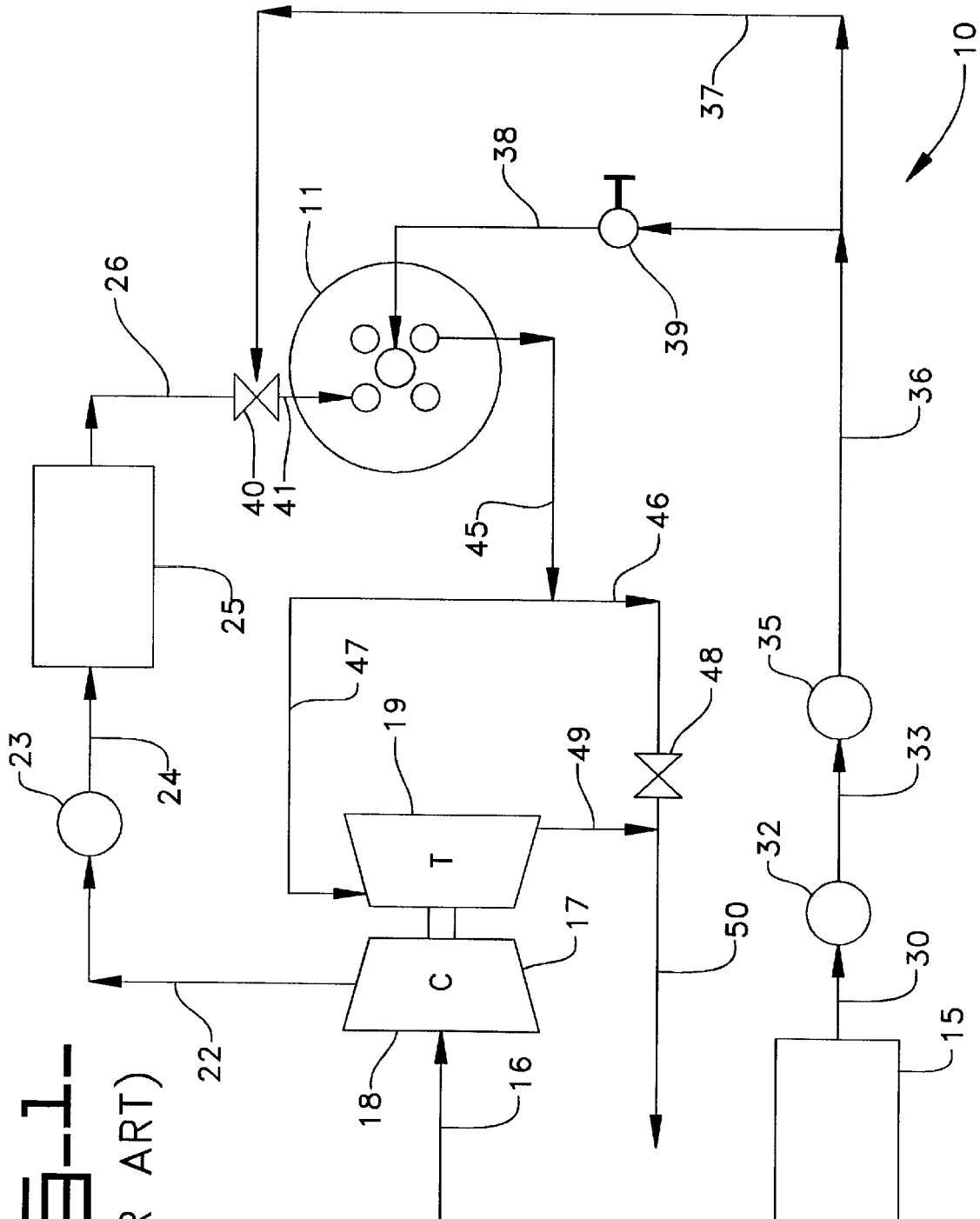
FIG. 1 is a schematic view of a fuel and air supply system for a gaseous fuel engine according to the prior art.

Referring now to FIG. 1, a prior art air/fuel system 10 is illustrated with a single cylinder 11 of a gaseous fuel engine (not shown). A high pressure gaseous fuel supply line 30 has one end connected to a source of relatively high pressure gaseous fuel 15. In the case of Caterpillar 3600 gaseous fuel engines, this gaseous fuel supply 15 must be at a pressure at least about 40 psig in order for the engine to support a substantial load. In accordance with the prior art, gas supply 15 is typically pressurized using a separate compressor unit.

The high pressure gas passing through line 30 first passes through a gas shutoff valve 32 on its way to the engine. This valve allows the engine to be quickly shutoff by abruptly stopping the supply of fuel to the engine. Another high pressure gaseous fuel supply line 33 interconnects gas shutoff valve 32 with a gas control valve 35. Control valve 35 is preferably an electronically controlled variable orifice valve that essentially functions as a throttle by controlling the mass flow rate of fuel to the engine. As is known in the art, control valve 35 is preferably electronically controlled by a computer monitoring engine operating and load conditions. Control valve 35 opens to a high pressure gas line manifold 36, which can be considered as the engine fuel inlet. The gas control valve controls the gaseous fuel pressure in gas line manifold 36 through electronic control of a variable area orifice valve of a type known in the art. Gas line manifold 36 typically provides individual supply lines to each cylinder of the engine. In order to avoid unnecessary clutter, only a single cylinder 11 of the gaseous engine is illustrated. Gaseous fuel is supplied to each cylinder via a prechamber gas line 38 and a main cylinder gas line 37. A prechamber needle valve 39 is positioned in the prechamber gas line 38 and serves as a means for regulating fuel pressure in the prechamber gas line down stream from the needle valve.

While prechamber gas line 38 supplies pure gaseous fuel at a lower pressure to the combustion prechamber in this type of gaseous fuel engine, each main cylinder is supplied with a mixture of gaseous fuel and compressed air via mixture supply line 41. The compressed gaseous fuel in the main cylinder gas line 37 is mixed with pressurized air in air intake line manifold 26 at the gas admission valve 40. Gas admission valve 40 is preferably of a type known in the art in which a pressure differential is maintained between air intake line manifold 26 and the main cylinder gas line 37 in order to maintain a proper mixture in supply line 41. In the case of the present invention, this pressure differential is preferably at least about 1.5 psig, which corresponds to the relatively low pressure of typically available gaseous fuel supplies. The gas admission valve controls the mass flow of the combustible gas air mixture to each cylinder 11 of the engine.

A turbocharger 17 is utilized to provide compressed air to air intake line manifold 26. In particular, ambient air 16 is drawn into the inlet of compressor 18 of the turbocharger. A compressed air supply line 22 has one end connected to the outlet from compressor 18 and its other end to a choke 23, which can be thought of as an engine air inlet. Choke 23 is preferably electronically controlled, but is normally maintained fully open except when it is necessary to create a vacuum in air intake line manifold 26. This typically occurs under low idle and no load conditions. Thus, under certain conditions choke 23 renders the air in intake line manifold 26 lower than ambient pressure. Air leaving choke 23 passes along an air supply line 24 and through an aftercooler 25 of a type known in the art before entering air intake line manifold 26.

Turbocharger 17 includes a turbine 19 having a turbine supply line 47 that is connected to exhaust line manifold 45 from the engine. In order to control the amount of exhaust gases supplied to turbine supply line 47, a wastegate valve 48 controls exhaust mass flow through turbine bypass line 46. Turbine outlet 49 reconverges with turbine bypass line 46 in the exhaust stack 50, which opens to the atmosphere. Wastegate 48 is the means by which air pressure within air intake line manifold 26 is controlled when compressed pressure air is needed. When it is desired to raise air pressure to the engine, wastegate 48 is moved toward a closed position so that substantially more exhaust passes through turbine 19 instead of through the wastegate. By controlling the speed of turbine 19 via wastegate valve 48, the speed of compressor 18 can likewise be controlled and also the corresponding air pressure in compressed air supply line 22.

Figure 2:
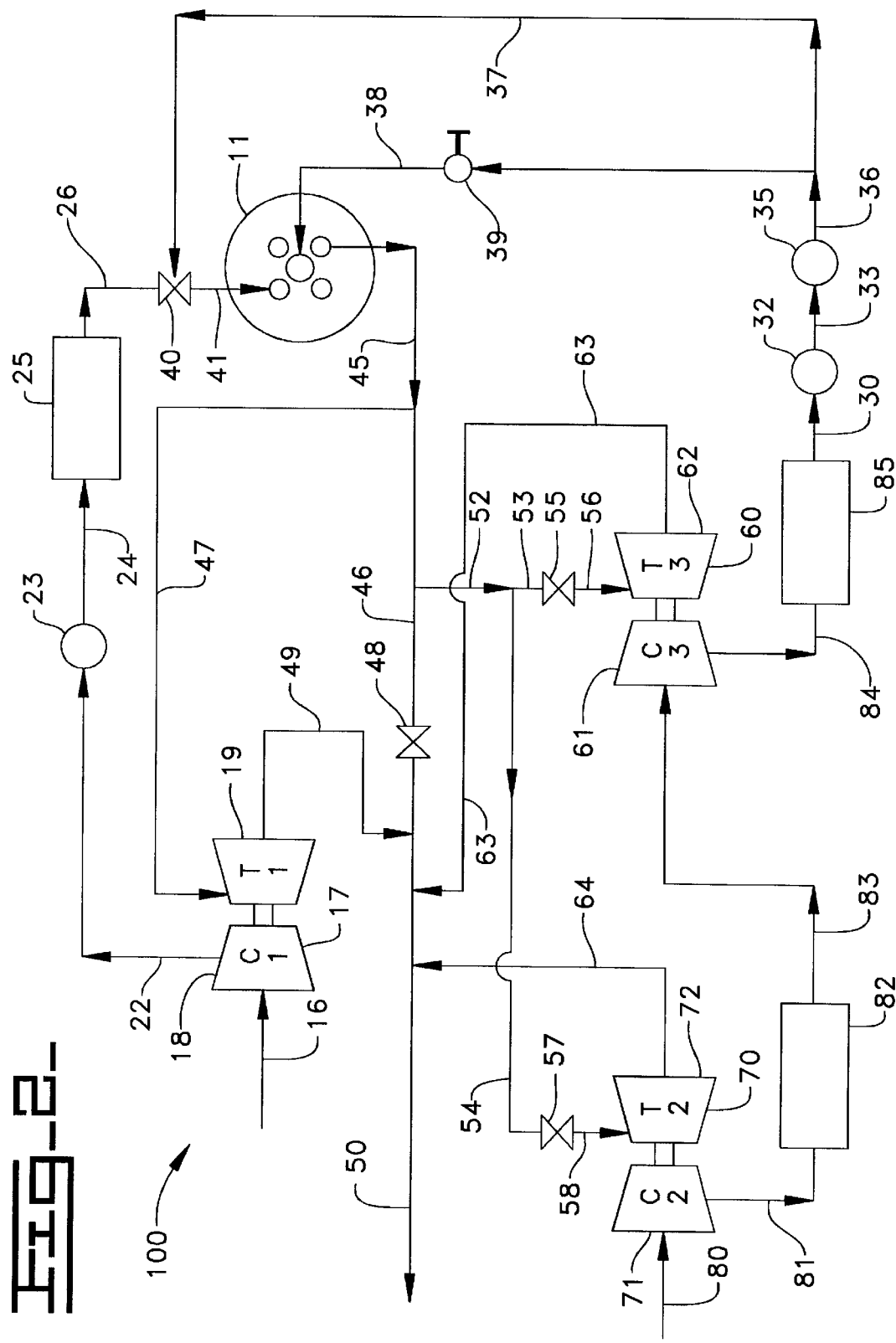
FIG. 2 is a schematic view of a fuel and air supply system for a gaseous fuel engine according to the preferred embodiment of the present invention.

Referring now to FIG. 2, an air/fuel supply system 100 according to the present invention includes many of the same features of the prior art system shown in FIG. 1. The features that remain the same from the prior art are identically numbered, and the reader is referred to the discussion of these features in relation to the prior art system for any detailed description. Unlike the prior art, the air/fuel system 100 according to the present invention includes at least one additional turbocharger 70 that serves as a means for pressurizing the gaseous fuel. This embodiment is shown preferably including two turbochargers 60 and 70 on the fuel supply side. The current state of the art in turbocharger technology requires two turbochargers in order to raise gas pressure from about 1.5 psig to about 45 psig. Thus, the system shown in FIG. 2 is capable of supplying relatively high pressure gaseous fuel (about 45 psig) so that a Caterpillar series 3600 gaseous fuel engine can operate at full load conditions. While the engine can operate with a gaseous fuel supply below about 1.5 psig, for practical purposes, especially when starting the engine, at least some fuel pressure on this order is needed.

When in operation, low pressure gaseous fuel from low pressure supply 80 enters the inlet of compressor 71. Compressed gaseous fuel leaves compressor 71 through a supply line 81, passes through an aftercooler 82 on its way to compressor 61 via supply line 83. Compressor 61 further raises the pressure of the gaseous fuel which leaves the compressor via supply line 84. After passing through a second aftercooler 85, the compressed gaseous fuel enters high pressure gas supply line 30. From this point and downstream, the supply system according to the present invention is substantially identical to that of the prior art.

The turbines of turbochargers 60 and 70 are connected in parallel to each other and to the turbine supply line 47 which supplies exhaust gas to turbocharger 17 on the air supply side. A turbine supply line manifold 52 is connected to exhaust line manifold 45 upstream from wastegate valve 48. Turbine line manifold supply 52 branches into a pair of parallel turbine supply passages 53 and 54. A first flow control valve 55 controls the amount of exhaust gas that is allowed to reach turbine 62 via turbine supply line 56. Exhaust from turbine 62 is carried back to the exhaust stack 50 via a turbine outlet line 63. A second flow control valve 57 controls the amount of exhaust flow that is allowed to pass through turbine 72 from turbine supply line 58. A turbine exhaust line 64 connects the exhaust stack 50 with the outlet from turbine 72. Those skilled in the art will appreciate that both the air pressure in air intake line manifold 26 and the gaseous fuel pressure in high pressure gas supply line 30 can be controlled via wastegate valve 48 and flow control valves 55 and 57. In other words, those skilled in the art will appreciate that the output pressure of each of the compressors 18, 61 and 71 can be controlled by controlling their respective turbine speeds.

Figure 3:
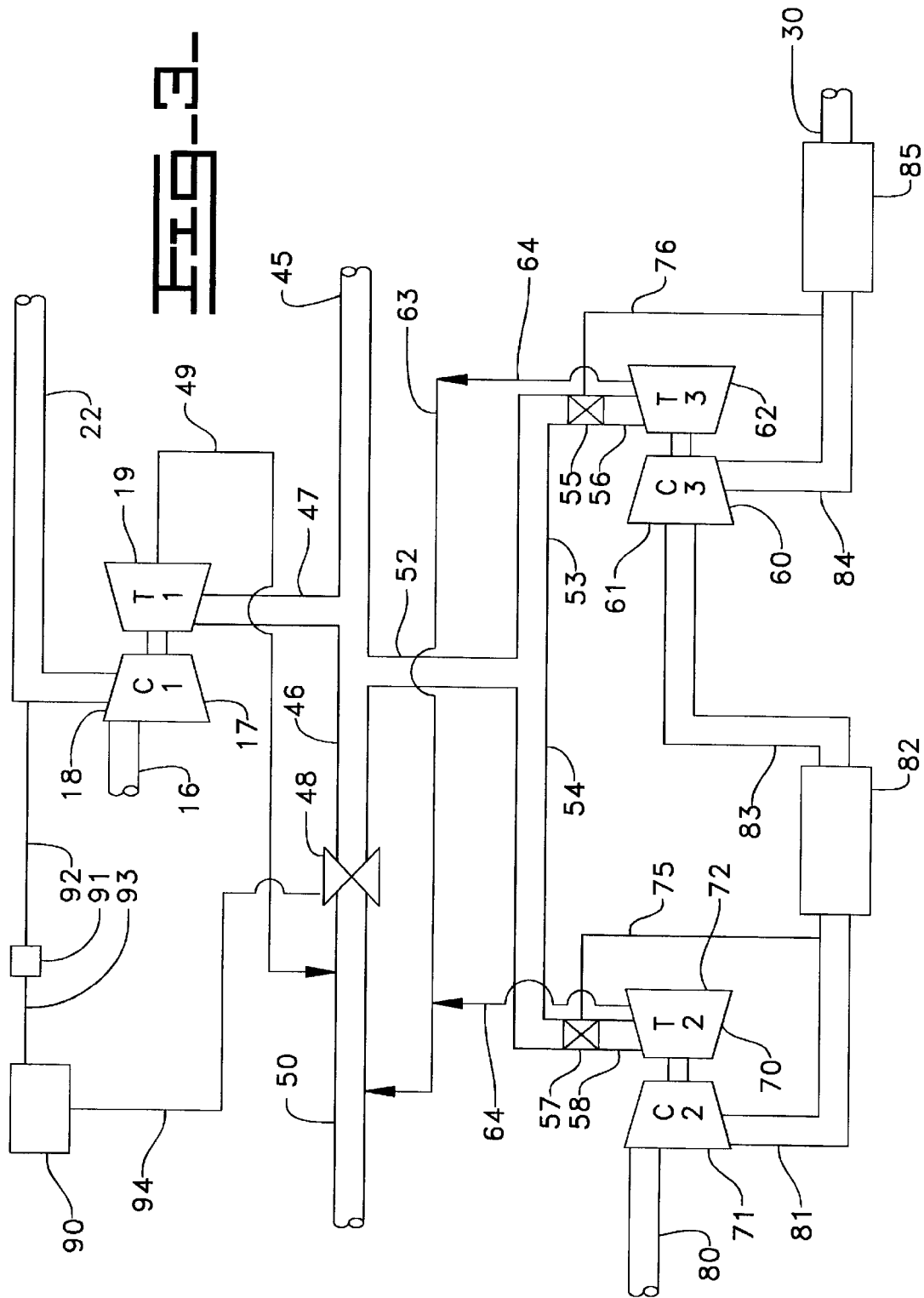
FIG. 3 is a schematic view of a control system for an air and fuel supply system according to the one aspect of the present invention.

Referring now to FIG. 3, the preferred mechanisms for controlling wastegate 48 and flow control valves 55 and 57 is illustrated in conjunction with their associated turbochargers. In particular, wastegate valve 48 is preferably electronically controlled by an Electronic Control Module (ECM) 90 via communication line 94. Although not shown, ECM 90 monitors a variety of engine operating and load conditions in order to ascertain a desired compressed air pressure for the engine. A sensor 91 monitors the compressed air pressure in compressed air supply line 22 via a tap 92. This compressed air pressure is continuously communicated to ECM 90 via communication line 93. ECM 90 then compares the desired compressed air pressure to the actual compressed air pressure and moves wastegate valve 48 either to a more open or more closed position depending upon whether the compressed air pressure is too high or too low. If the compressed air pressure is too low, wastegate valve 48 is moved toward a closed position so that more exhaust gas can travel into turbine 19 via turbine supply line 47. Likewise, wastegate valve 48 is moved toward a more open position if the compressed air pressure in compressed air supply line 22 becomes higher than that desired for a particular engine operating and load condition. Those skilled in the art will appreciate that a myriad of other means, such as a passive mechanically biased valve, could be provided for controlling wastegate valve 48 and the pressure within compressed air supply line 22.

In this embodiment, flow control valves 55 and 57 are preferably mechanical and biased to an open position but close in response to pressure within their respective balance lines 75 and 76. In particular, balance line 76 communicates the pressure within high pressure gaseous fuel supply line 84 to flow control valve 55. When the pressure within this supply line exceeds about 45 psig for this engine application, the pressure within balance line 76 moves flow control valve 55 toward a closed position in order to reduce exhaust flow into turbine 62, which results in a lowering of the corresponding pressure in high pressure supply line 84. The balance line 75 for flow control valve 57 communicates the pressure within compressor connecting supply line 81 to the flow control valve. Flow control valve 57 is a type known in the art and similar in construction to flow control valve 55. In this case, flow control valve 57 is biased opened but moves toward a closed position when the pressure within connecting supply line 81 exceeds a pre-determined amount, such as about 20 psig. In this preferred embodiment, flow control valves 55 and 57 are essentially passive mechanical means of preventing turbochargers 60 and 70 from becoming overspun. Thus, unless the respective turbocharger is in danger of becoming overspun, the corresponding flow control valve is wide open in order to utilize the maximum amount of energy in the exhaust to compress the gaseous fuel.

Industrial Application

Referring now to FIG. 4, it is apparent that the Caterpillar 3600 series gaseous fuel engines that have been utilized to illustrate the fuel/air supply system of the present invention can be operated in an idle condition with an actual fuel pressure vacuum. Although this graph demonstrates that these engines are capable of operating at idle conditions with an extremely low fuel supply pressure that can actually be lower than ambient pressure, it is extremely difficult to start these engines under these vacuum conditions. This is further complicated by the fact that the air pressure supply to the engine must be even lower than the fuel pressure in order for the gas admission valve 40 (FIG. 1) to properly function in metering a combustible mixture to the engine. Since it is extremely difficult to create a vacuum in both the air supply and the fuel supply when starting the engine, it has been found that for all practical purposes a minimum required fuel pressure on the order of about 1.5 psig is necessary. Under these conditions, air supplied at ambient pressure is mixed with the slightly higher pressure gaseous fuel at the gas admission valve so that the engine is started at conditions corresponding to a low load high idle condition. Soon after the engine is started the engine is capable of creating the necessary vacuums in order to operate in a low idle condition. Also, shortly after being started, the turbochargers are quickly spun up so that the engine is capable of operating in a loaded condition. FIG. 4 shows that at 100% load these gaseous fuel engines require a fuel pressure on the order of about 45 psig.

Referring now to FIG. 5, the required fuel in standard cubic feet per minute is plotted against engine load condition for several Caterpillar 3600 series gaseous fuel engines. This graph shows that at low idle conditions less than 100 standard cubic feet per minute are required. This graph also shows that the maximum required fuel varies considerably at 100% engine load conditions between the three different example engines.

The present invention finds potential application in a air/fuel supply system for gaseous engines where it is desired to compress the air and fuel separately. Unlike the prior art, the fuel/air supply system of the present invention does not draw power from the engine that could otherwise be used to do useful work. Furthermore, the fuel side turbochargers of the present invention can be added to the prior art system of FIG. 1 without creating additional back pressure on the engine. The reason being that in the case of the present invention a portion of the exhaust gas that otherwise left the system through the wastegate valve is now used to power the turbochargers that compress the gaseous fuel.

The above description is intended for illustrative purposes only, and the present invention is not intended to be limited in any way by the use of example engines that were utilized to describe the invention. For instance, those skilled in the art will appreciate that the gas/fuel supply system of virtually any gaseous fuel engine could exploit the principals of the present invention, despite the particular fuel pressure demands of a particular engine. Furthermore, although the present invention has been illustrated as utilizing two turbochargers on the fuel side of the supply system, some systems may require only a single turbocharger while other systems could utilize more than two turbochargers. This would depend primarily upon the maximum pressure needed by a particular engine and the expected lowest pressure that the gaseous fuel will be supplied to the same. It is also important to note that although the fuel side turbines have been shown in parallel, in some systems it may be desirable to arrange the same in series. In any event, the scope of the present invention is to be determined solely by the claims as set forth below.

We claim:

1. A turbo compounded air and fuel supply system for a gaseous fuel engine comprising:

a first turbocharger having a first turbine connected to an exhaust line from the engine and a first compressor with an inlet open to a source of air;

a compressed air supply line with one end connected to an outlet from said first compressor and its other end connected to an engine air inlet;

a gaseous fuel supply line with one end connected to a source of low pressure gaseous fuel;

a second turbocharger having a second turbine connected to said exhaust line from said engine and a second compressor having an inlet connected to said gaseous fuel supply line;

a high pressure gaseous fuel supply line with one end connected to an outlet from said second compressor and its other end connected to an engine fuel inlet;

a turbine bypass line with one end connected to said exhaust line and an other end that opens to atmosphere;

a wastegate valve positioned in said turbine bypass line;

said first turbine, said second turbine and said turbine bypass line are connected in parallel to said exhaust line;

a flow control valve positioned between said exhaust line and said second turbine; and said flow control valve is biased open but includes means for closing proportionate to a rise in fuel pressure within said high pressure gaseous fuel supply line.

2. The system of claim 1 wherein said means for closing closes said flow control valve when said fuel pressure is above a threshold pressure.

3. The system of claim 2 wherein said means for closing includes a balance line extending between said high pressure gaseous fuel supply line and said flow control valve.

4. The system of claim 3 further comprising an air pressure sensor capable of sensing air pressure in said compressed air supply line; and
   a computer in communication with said air pressure sensor and said wastegate valve, and being capable of controlling said wastegate valve.

5. The system of claim 4 further comprising a third turbocharger with a third turbine connected to said exhaust line and a third compressor connected to said gaseous fuel supply line between said source of low pressure gaseous fuel and said second compressor.

6. The system of claim 5 wherein said third turbine, said second turbine, said first turbine and said turbine bypass line are connected in parallel to said exhaust line; and
   a second flow control valve positioned between said exhaust line and said third turbine.

7. The system of claim 6 wherein said second flow control valve is biased open but includes means for closing proportionate to a rise in fuel pressure from said third compressor.

8. The system of claim 7 wherein said means for closing said second flow control valve closes said second flow control valve when the fuel pressure leaving said third compressor is above a threshold pressure.

9. The system of claim 8 wherein said means for closing said second flow control valve includes a second balance line.

10. A turbo compounded air and fuel supply system for a gaseous fuel engine comprising:
    a first turbocharger having a first turbine connected to an exhaust line from the engine and a first compressor with an inlet open to a source of air;
    a compressed air supply line with one end connected to an outlet from said first compressor and its other end connected to an engine air inlet
    a gaseous fuel supply line with one end connected to a source of low pressure gaseous fuel;
    a second turbocharger having a second turbine connected to said exhaust line from said engine and a second compressor having an inlet connected to said gaseous fuel supply line;
    a high pressure gaseous fuel supply line with one end connected to an outlet from said second compressor and its other end connected to an engine fuel inlet; and
    a flow control valve positioned between said exhaust line and said second turbine, and being biased to a closed position when fuel pressure is above a threshold pressure.

11. The system of claim 10 further comprising a turbine bypass line with one end connected to said exhaust line and an other end that opens to atmosphere.

12. The system of claim 11 further comprising a wastegate valve positioned in said turbine bypass line.

13. The system of claim 11 wherein said turbine bypass line, said first turbine and said second turbine are connected to said exhaust line in parallel.

14. The system of claim 10 further comprising a third turbocharger with a third turbine connected to said exhaust line and a third compressor connected to said gaseous fuel supply line between said source of gaseous fuel and said second compressor.

15. The system of claim 14 wherein said third turbine is connected to said exhaust line in parallel with said first turbine, said second turbine and said turbine bypass line.

16. A turbo compounded air and fuel supply system for a gaseous fuel engine comprising:
    a first turbocharger having a first turbine connected to an exhaust line from the engine and a first compressor with an inlet open to a source of air;
    a compressed air supply line with one end connected to an outlet from said first compressor and its other end connected to an engine air inlet
    a gaseous fuel supply line with one end connected to a source of low pressure gaseous fuel;
    a second turbocharger having a second turbine connected to said exhaust line from said engine and a second compressor having an inlet connected to said gaseous fuel supply line;
    a high pressure gaseous fuel supply line with one end connected to an outlet from said second compressor and its other end connected to an engine fuel inlet; and
    a third turbocharger with a third turbine connected to said exhaust line and a third compressor connected to said gaseous fuel supply line between said source of gaseous fuel and said second compressor.

17. The system of claim 16 further comprising a wastegate valve positioned in said turbine bypass line.

* * * * *